United States Patent [19]

Armand et al.

[11] Patent Number: 4,851,307

[45] Date of Patent: Jul. 25, 1989

[54] IONICALLY CONDUCTIVE MATERIAL

[75] Inventors: Michel Armand, St Martin D'Uriage, France; Michel Gauthier, La Prairie, Canada; Daniel Muller, Pau, France

[73] Assignees: Societe Nationale Elf Aquitaine, Courbevoie, France; Hydro-Quebec, Montreal, Canada

[21] Appl. No.: 114,721

[22] Filed: Oct. 30, 1987

[30] Foreign Application Priority Data

Oct. 30, 1986 [FR] France ................. 86 15113

[51] Int. Cl.$^4$ ............... H01M 6/18; H01M 6/16
[52] U.S. Cl. ...................... 429/192; 429/194
[58] Field of Search ................. 429/192, 194

[56] References Cited

U.S. PATENT DOCUMENTS

| | | | |
|---|---|---|---|
| 4,216,276 | 8/1980 | Weddigen et al. | 429/104 |
| 4,303,748 | 12/1981 | Armand et al. | 429/192 |
| 4,505,997 | 3/1985 | Armand et al. | 429/192 |
| 4,542,081 | 9/1985 | Armand et al. | 429/192 |
| 4,556,616 | 12/1985 | Armand et al. | 429/192 |
| 4,618,548 | 12/1986 | Brule | 429/194 |
| 4,668,596 | 5/1987 | Shacklette et al. | 429/194 |

*Primary Examiner*—Donald L. Walton
*Attorney, Agent, or Firm*—Oblon, Spivak, McClelland, Maier & Neustadt

[57] ABSTRACT

An ionically conductive material useful in electrochemical generators is disclosed. This ionically material comprises a salt in solution in a solvent. The solvent comprises a sulfonated derivative of Formula (I):

$$R_1R_2N-SO_2NR_3R_4$$

wherein $R_1$, $R_2$, $R_3$ and $R_4$ are each independently a $C_{1-10}$ alkyl group or a $C_{1-10}$ oxaalkyl group.

23 Claims, 2 Drawing Sheets

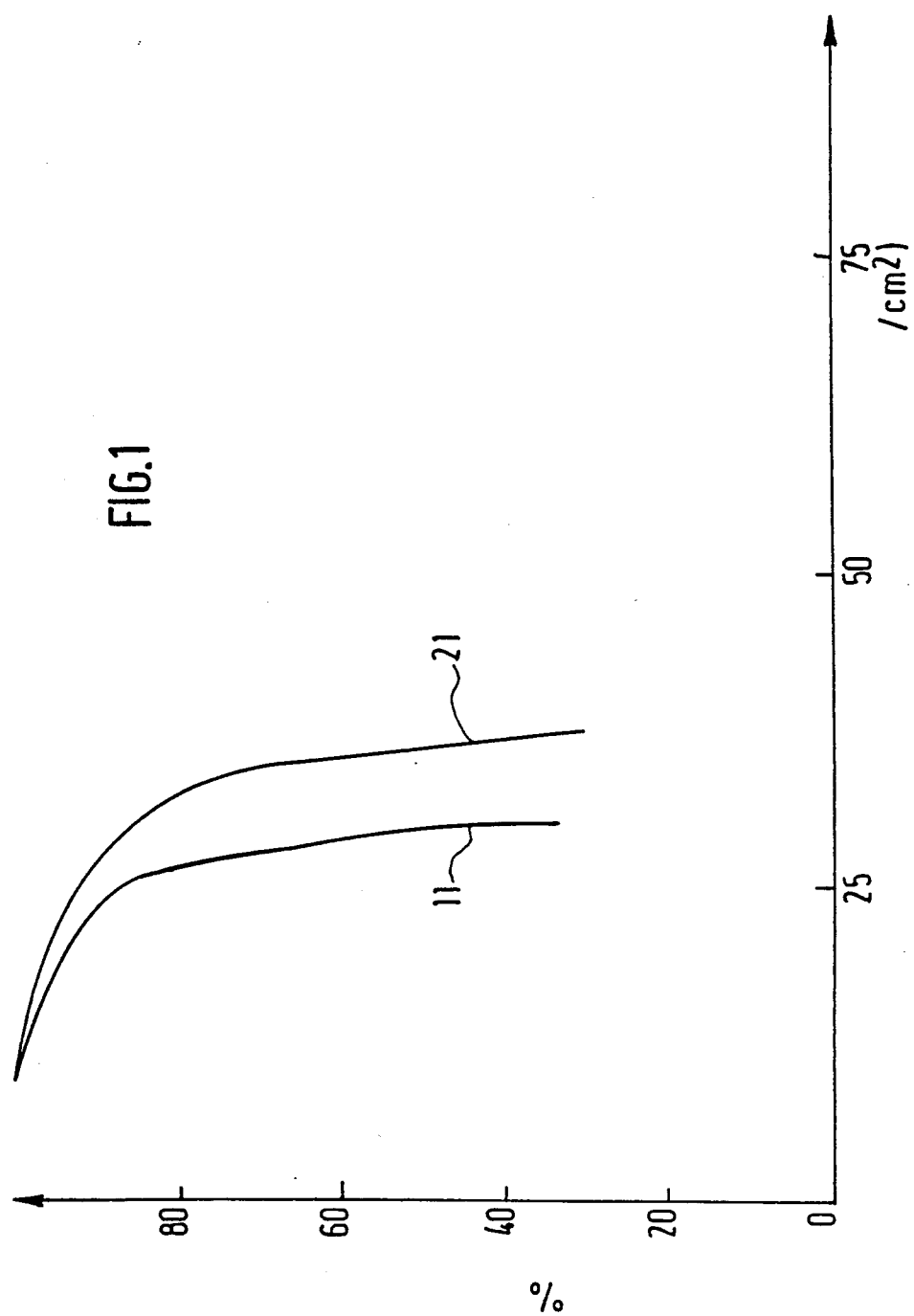

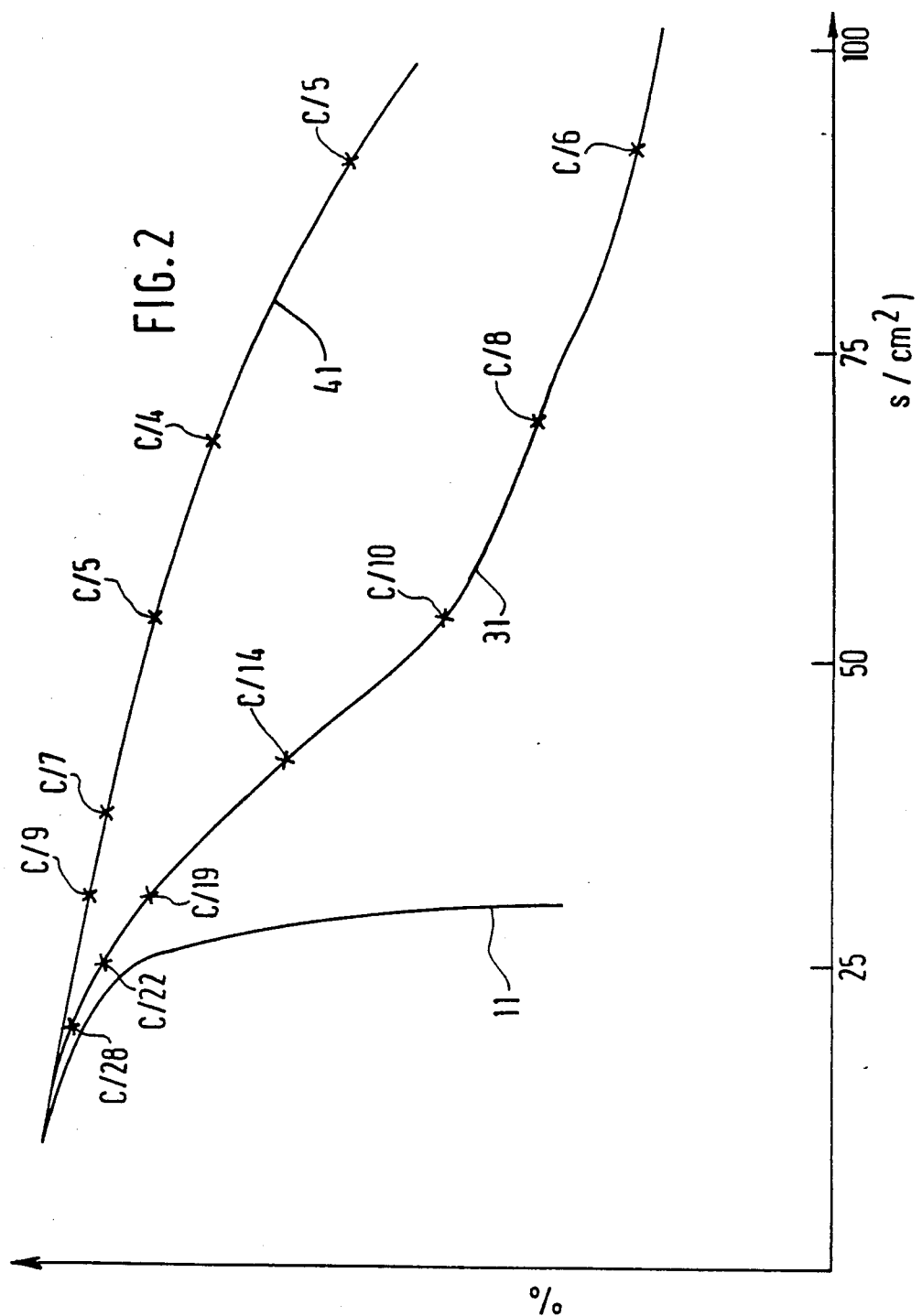

IONICALLY CONDUCTIVE MATERIAL

BACKGROUND OF THE INVENTION

This invention relates to ionically conductive materials useful in electrochemical generators.

SUMMARY OF THE INVENTION

It is an object of this invention to provide a novel ionically conductive material useful in electrochemical generators.

It is another object of this invention to provide a novel ionically conductive material which provides an electrochemical generator having an improved rate of discharge.

It is another object of this invention to provide a novel ionically conductive material which improves the performance of electrochemical generators.

The inventors have now discovered a new ionically conductive material composed of a salt in solution in a solvent which satisfies the above objects of this invention and other objects which will become apparent from the description of the invention given hereinbelow. The solvent comprises a sulfonated derivative of the Formula (I):

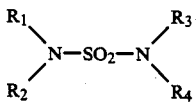
(I)

wherein $R_1$, $R_2$, $R_3$ and $R_4$ are each independently a $C_{1-10}$ alkyl group or a $C_{1-10}$ oxaalkyl group. These alkyl and oxalkyl groups can be liner, branched or cyclic.

Thus the present invention provides a novel ionically conductive material containing a salt in solution in the sulfonated derivative Formula (I) and an improved electrochemical generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures, wherein:

FIG. 1 illustrates the percentage utilization as a function of discharge current density for two electrochemical generators distinguished by the fact that one contains the solvent used in the present invention and the other one does not;

FIG. 2 illustrates variation of the proportion of utilization as a function of the discharge current density for three different generators at a temperature of 25° C., wherein one electrochemical generator does not contain the solvent provided by the present invention and the other two do.

DETAILED DESCRIPTION OF THE PREFERRED EMBODIMENTS

This invention provides a new ionically conductive material composed of a salt in solution in a solvent. This material can be liquid or solid.

In accordance with the invention, the solvent comprises a sulfonated derivative of Formula I:

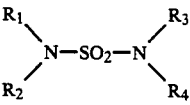

in which $R_1$, $R_2$, $R_3$, and $R_4$ are different or identical and represent an alkyl or oxaalkyl group each having 1 to 10 carbon atoms. This solvent can be obtained using techniques known in the art.

Preferably, either (1) $R_1$ and $R_2$ are identical and are both a methyl group, while $R_3$ and $R_4$ are each an ethyl group, or (2) the four groups $R_{1-4}$ are each an ethyl group.

The salt in solution is a metallic salt derived from a strong acid. For example, it can be selected from those described in European Pat. No. 0013199: "Electrochemical generators for the production of current and materials for making them", or from the salts described in French Pat. No. 2 527 602, French Pat. No. 2 527 610, or French Pat. No. 2 527 611. With respect to the above patent publications EP No. 013199 corresponds to U.S. Pat. No. 4,303,748, FR No. 2 527 602 corresponds to U.S. Pat. No. 4,505,997, FR No. 2 527 610 corresponds to U.S. Pat. No. 4,542,081 and FR No. 2 527 611 corresponds to U.S. Pat. No. 4,556,616. U.S. Pat. No. 4,303,748, U.S. Pat. No. 4,505,997, U.S. Pat. No. 4,542,081 and U.S. Pat. No. 4,556,611 are all hereby incorporated by reference.

In particular, the salt can be composed of a sulfonated derivative represented by one of the formulas II to V below:

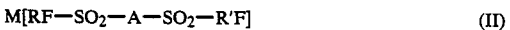
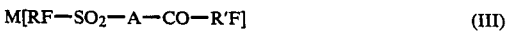

wherein:

M is an alkali metal, an alkaline-earth metal, a transition metal or a rare earth metal;

QF is a $C_{2-6}$ divalent radical or a perfluorinated $C_{2-6}$ divalent radical;

RF and R'F can be different or identical and each represents a $C_{1-12}$ alkyl or a $C_{6-12}$ aryl group. The aforesaid group are advantageously perhalogenated and especially perfluorinated; and A represents either a nitrogen atom or a CR group in which R is either hydrogen or an alkyl having from 1 to 20 carbon atoms.

Pursuant to another embodiment of the invention, the ionically conductive material also contains a macromolecular material in which the salt is dissolved. Thus, the macromolecular material is present in the form of a solid electrolyte of the type described in European Pat. No. 013199, in which the sulfonated derivative of Formula (I) plays the role of a plasticizing agent, i.e., it prevents or at least limits the phase changes of the polymer by which the polymer becomes crystalline.

In this form of embodiment, the macromolecular material can be selected from those described in European Pat. No. 013199, i.e., polymers composed of homopolymers or copolymers containing chains including at least one oxygen atom or one nitrogen atom for every four to two carbon atoms. These heteroatoms can participate directly in the creation of the chain, or can be linked laterally to the carbon atoms of a principal chain.

These macromolecular materials can accordingly be selected from the polyethers or from the polyphosphazenes.

By way of the example, the macromolecular material can be derived from the monomeric units of the type represented either by the following formula:

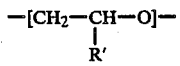

wherein:

R' represents an atom of hydrogen or one of the groups $R_a$, $-CH_2-O-R_a$, $-CH_2-O-R_3-R_a$, $-CH_2-N(CH_3)_2$;

$R_a$ represents an alkyl or cycloalkyl group, especially having from 1 to 16, preferably from 1 to 4 carbon atoms, $R_3$ represents a polyether group of the general formula $-(CH_2-CH_2-O)_p-$, with p having a value from 1 to 100, especially from 1 to 2, or by the following formula:

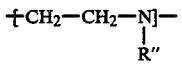

in which R" represents $R_a$, $-R_3-R_a$, with $R_a$ and $R_e$, respectively, having one of the meanings indicated above, or by the following formula:

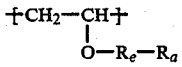

in which $R_a$ and $R_e$, respectively, have one of the meanings indicated above.

This macromolecular material is preferably an amorphous, isotropic, elastomeric material, derived from monomeric units of the type represented either by the following formula:

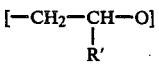

in which R' represents one of the groups $R_a$, $-CH_2-O-R_a$, $-CH_2-O-R_e-R_a$, $-CH_2-N(CH_3)_2$, with $R_a$ representing an alkyl or cycloalkyl group, especially one having from 1 to 12, preferably from 1 to 4 carbon atoms, $R_e$ representing a polyether group of the general formula $-(CH_2-CH_2-O)_p-$, with p having a value from 1 to 10, or by the following formula:

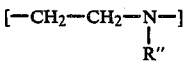

in which R" represents $R_a$, $-R_e-R_a$, with $R_a$ and $R_e$, respectively, having one of the meanings indicated above, or by the following formula:

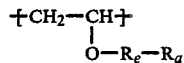

in which $R_a$ and $R_e$, respectively, have one of the meanings indicated above.

This macromolecular material can be used as a liquid or solid electrolyte to make electrochemical generators for the production of electrical current, primary as well as secondary electrochemical generators, but it can also be used in any way that utilizes the ionic mobility of the salt in solution.

For making electrochemical generators, it can be used as a solid electrolyte, but also as a component of a composite electrode, i.e., of an electrode in which each particle of active substance is coated with the aforesaid ionically conductive material as described in European Pat. No. 013199.

Other features of the invention will become apparent in the course of the following descriptions of exemplary embodiments which are given for illustration of the invention and are not intended to limiting thereof.

EXAMPLE 1

Comparison (Generator (1))

An electrochemical generator (1) was made, with the generator (1) having a negative electrode composed of a sheet of lithium, a positive electrode based on $TiS_2$, and an electrolyte composed of lithium perchlorate in solution in a copolymer of ethylene oxide and methyl glycidyl ether.

FIG. 1 shows a curve (11) which gives the percentage of utilization as a function of the discharge current density.

EXAMPLE 2

Invention (Generator (2))

The same electrochemical generator was then made, but in which the electrolyte contained 10% by weight relative to the polymer of a solvent pursuant to the invention represented by the following formula:

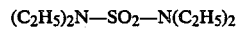

This solvent is called tetraethylsulfonamide (TESA).

Also shown in the same FIG. 1 is a curve (21) which corresponds to generator (2). It can be seen that this curve is shifted relative to curve (1) by approximately 5%. This shows a notably improvement in the utilization of the generator pursuant to the invention.

EXAMPLE 3

Invention (Generator (3))

The positive electrode and the negative electrode of generator (3) are similar to those of the generators (1) and (2). The electrolyte is the same as that of the generator (2), but the lithium perchlorate has been replaced by a trifluorosulfonoimide (TFSI) of the formula: $(CF_3SO_2)_2 N Li$ as described in U.S. Pat. No. 4,505,997. This generator accordingly contains 10% by weight of TESA relative to the total weight of polymer.

Generator No. 3 had a positive electrode capacity of 2 $C/cm^2$.

EXAMPLE 4

Invention (Generator (4))

Generator No. 4 which was identical to generator No. 3, but with a positive electrode capacity equal to 1 C/cm², was made.

FIG. 2 shows variation of the proportion of utilization as a function of the discharge current density for generator No. 1 (11), for generator No. 3 (31), and for generator No. 4 (41), with the tests being made at 25° C.

Also indicated on curves (41) and (31) are the discharge conditions (for example C/10) that indicate the time during which the cell was discharged.

It can be seen from these curves that the rates of discharge have again been improved, and that these are accordingly efficient generators. It has also been verified that the same improvement of the discharge rate is obtained at temperatures down to at least 10° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ionically conductive material comprising a salt in solution in a solvent, wherein said solvent comprises (1) a sulfonated derivative of formula (I):

$R_1R_2N—SO_2—NR_3R_4$ wherein $R_1$, $R_2$, $R_3$ and $R_4$ are each independently a $C_{1-10}$ alkyl group or a $C_{1-10}$ oxaalkyl group, and (2) a macromolecular material.

2. The material of claim 1, wherein $R_1$ and $R_2$ are each a methyl group.

3. The material of claim 2, wherein $R_3$ and $R_4$ are each an ethyl group.

4. The material of claim 1, wherein $R_1$, $R_2$, $R_3$ and $R_4$ are each an ethyl group.

5. The material of claim 1, wherein said salt is a metallic salt.

6. The material of claim 5, wherein said metallic salt is the salt of a strong acid.

7. The material of claim 1, wherein said macromolecular material is a homopolymer or a copolymer derived from monomeric units containing at least one oxygen atom or one nitrogen atom per monomer unit.

8. The material of claim 7, wherein said monomeric units contain at least one oxygen atom or at least one nitrogen atom for each four carbon atoms contained in said monomeric unit.

9. The material of claim 7, wherein said material is solid.

10. The material of claim 9, wherein said material is amorphous at temperatures of at least 10° C.

11. The material of claim 1, wherein said salt is a metallic salt which is one member selected from the group consisting of sulfonated derivatives represented by the formula $M[RF—SO_2—A—SO_2—R'F]$,

$M[RF—SO_2—A—CO—R'F]$, $M[RF—CO—A—CO—R'F]$ and

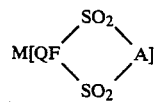

wherein M is a metal selected from the group consisting of alkali metals, alkaline-earth metals, transition metals and rare earth metals, QF is a $C_{2-6}$ divalent radical or a perfluorinated $C_{2-6}$ divalent radical, RF and R'F can be different or identical and each represents a radical selected from the group consisting of $C_{1-12}$ alkyl groups, $C_{6-12}$ aryl groups, perhalogenated $C_{1-12}$ alkyl groups, and perhalogenated $C_{6-12}$ aryl groups, and A represents a nitrogen atom or a group CR in which R is hydrogen or a $C_{1-20}$ alkyl group.

12. The material of claim 11, wherein RF and R'F are each independently a perflurointed $C_{1-12}$ alkyl group or a perfluorinated $C_{6-12}$ aryl group.

13. The material of claim 1, wherein said salt is LiClO₄ or $(CF_3SO_2)_2NLi$.

14. In an electrochemical generator, the improvement comprising using an ionically conductive material comprising a salt in solution in a solvent, wherein said solvent comprises (1) a sulfonated derivative of Formula (I):

$R_1R_2N—SO_2—NR_3R_4$ wherein $R_1$, $R_2$, $R_3$ and $R_4$ are each independently a $C_{1-10}$ alkyl group or a $C_{1-10}$ oxaalkyl group, and (2) a macromolecular material.

15. The electrochemical generator of claim 14, wherein $R_1$ and $R_2$ are each a methyl group.

16. The electrochemical generator of claim 15, wherein $R_3$ and $R_4$ are each an ethyl group.

17. The electrochemical generator of claim 14, wherein $R_1$, $R_2$, $R_3$ and $R_4$ are each an ethyl group.

18. The electrochemical generator of claim 14, wherein said salt is a metallic salt.

19. The electrochemical generator of claim 14, wherein said macromolecular material is either a homopolymer or a copolymer derived from monomeric units containing at least one oxygen atom or one nitrogen atom per monomer unit.

20. The electrochemical generator of claim 19, wherein said monomeric unit contains at least one oxygen atom or one nitrogen atom for each four carbon atoms in said monomeric unit.

21. The electrochemical generator of claim 14, wherein said salt is a metallic salt selected from the group consisting of the sulfonated derivatives of the formula $M[RF—SO_2—A—SO_2—R'F]$,

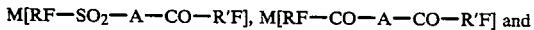

$M[RF—SO_2—A—CO—R'F]$, $M[RF—CO—A—CO—R'F]$ and

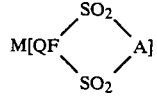

wherein M is a metal selected from the group consisting of alkali metals, alkaline-earth metals, transition metals and rare earth metals, QF is a $C_{2-6}$ divalent radical or a perfluorinated $C_{2-6}$ divalent radical, RF and R'F can be different or identical and each represents a radical selected from the group consisting of $C_{1-12}$ alkyl groups, $C_{6-12}$ aryl groups, perhalogenated $C_{1-12}$ alkyl groups, and perhalogenated $C_{6-12}$ aryl groups, and A represents a nitrogen atom or a group CR in which R is H or a $C_{1-20}$ alkyl radical.

22. The electrochemical generator of claim 21, wherein said RF and R'F are each independently a perfluorinated $C_{1-12}$ alkyl group or a perfluorinated $C_{6-12}$ aryl group.

23. The electrochemical generator of claim 14, wherein said salt is LiClO₄ or $(CF_3SO_2)_2NLi$.

* * * * *

UNITED STATES PATENT AND TRADEMARK OFFICE
CERTIFICATE OF CORRECTION

PATENT NO. : 4,851,307
DATED      : JULY 25, 1989
INVENTOR(S) : MICHEL ARMAND ET AL.

It is certified that error appears in the above-identified patent and that said Letters Patent is hereby corrected as shown below:

In Column 1, line 36, delete "liner" and insert --linear--.

In Column 2, line 29, delete "4,556,611" and insert --4,556,616--.

In Column 3, lines 20, 25 and 34 delete "$R_3$" and insert --$R_e$--.

In Column 6, line 12, delete "perflurointed" and insert --perfluorinated--.

In the drawings, label the X axis --Current Density-- and the Y axis --Utilization--.

Signed and Sealed this

Eleventh Day of June, 1991

*Attest:*

HARRY F. MANBECK, JR.

*Attesting Officer*  *Commissioner of Patents and Trademarks*